April 30, 1968

JULIO CESAR SANTOS DA SILVA BENTO 3,380,295

DEVICE FOR DIRECTLY MEASURING THE RATIO BETWEEN
A FLUID FLOW AND A ROTARY SPEED

Filed Jan. 25, 1966

$l_1 + l_2 = l \text{ (const.)}$

INVENTOR.
JULIO CESAR SANTOS DA SILVA BENTO

BY Steinberg & Blake

ATTORNEYS

April 30, 1968
JULIO CESAR SANTOS DA SILVA BENTO
3,380,295
DEVICE FOR DIRECTLY MEASURING THE RATIO BETWEEN
A FLUID FLOW AND A ROTARY SPEED
Filed Jan. 25, 1966
2 Sheets-Sheet
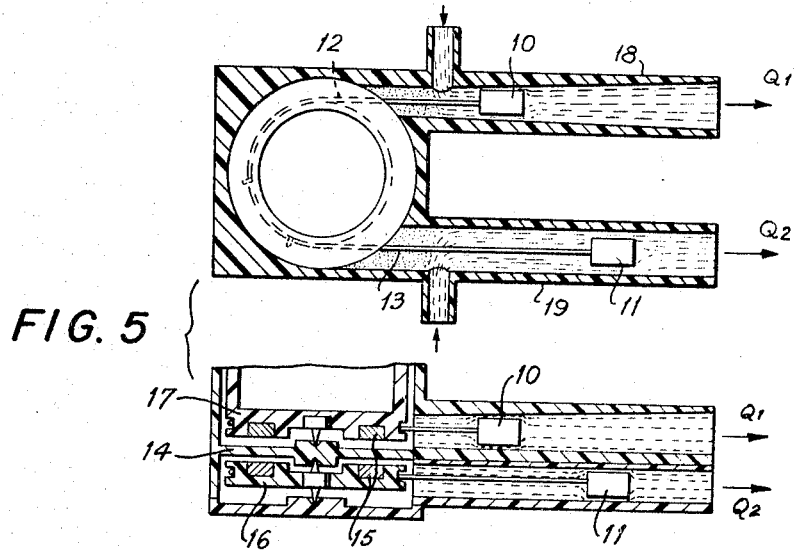
FIG. 5
FIG. 6
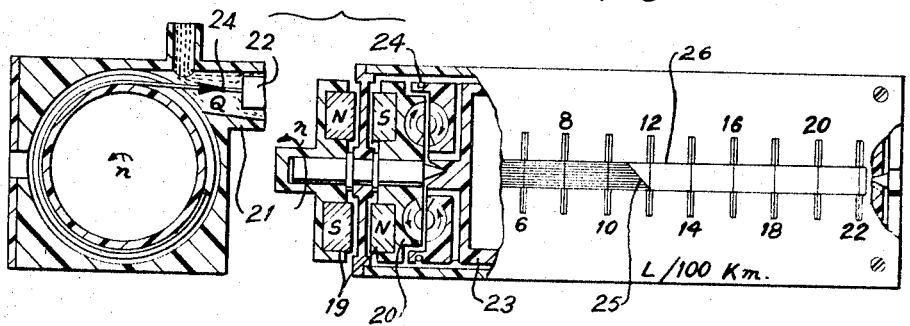
FIG. 7
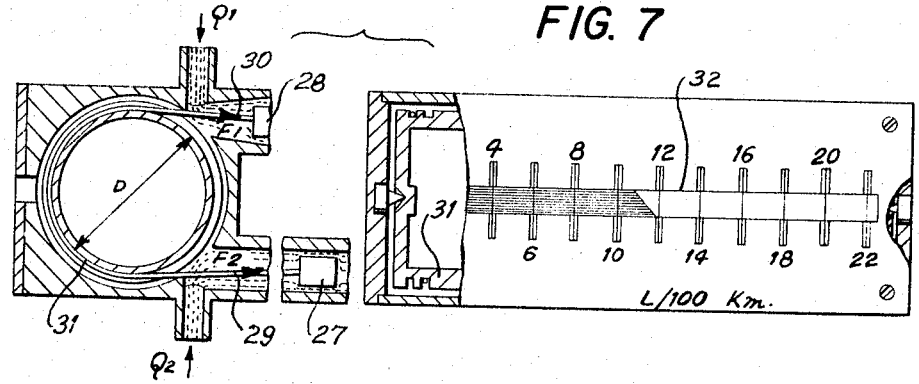
INVENTOR.
JULIO CESAR SANTOS DA SILVA BENTO
BY
*Steinberg & Blake*
ATTORNEYS

United States Patent Office 3,380,295
Patented Apr. 30, 1968

3,380,295
DEVICE FOR DIRECTLY MEASURING THE RATIO BETWEEN A FLUID FLOW AND A ROTARY SPEED
Julio Cesar Santos da Silva Bento, Rua S. Joao de Brito 2, Linda-a-Velha, Portugal
Filed Jan. 25, 1966, Ser. No. 522,866
10 Claims. (Cl. 73—114)

ABSTRACT OF THE DISCLOSURE

A device for instantaneously measuring the ratio between the flow of a fluid and a rotary speed. The fluid is directed through a conduit to act on a float therein so as to urge the float in a given direction along the conduit. A freely rotatable body is operatively connected with the float so as to be urged to turn in a given direction in response to the action of the fluid on the float. A rotary member is hydraulically coupled with the rotatable body in a manner providing the possibility of 100% slip between the rotary member and the rotatable body, and the hydraulic coupling causes the rotary member to urge the rotatable body to turn in a direction opposite to the direction in which it is urged to turn by the float. Thus, in a position of equilibrium the rotatable body and the float will have positions, respectively, which are indicative of the ratio between the fluid flow and the speed of rotation of the rotary member, and by indicating either the angular position of the rotatable body or the position of the float along the conduit it is possible to give an instantaneous measurement of the ratio between the fluid flow and the speed of rotation of the rotary member.

---

The present invention refers to a device for directly measuring the quotient between the flow of a fluid and any other second value whose relationship to the said flow should prove interesting. The flow of the fluid can be the flow of a fuel consumed at any moment by an engine and the second value may be a power, a torque, a strength, a speed, another flow or any other value. The interest of obtaining an instantaneous value for this quotient is so evident, that it does not have to be stressed in the present description.

The novelty of the device according to the present invention is essentially constituted by the fact of being direct and simple, thus eliminating a great number of error factors which are present in every known system. In order to obtain for instance the quotient between two flows, or between a flow and a speed, each one of the values to be compared is measured in a first step separately and these measurements are then transformed for instance into electrical currents which, in a second step, are compared, in order to obtin their quotient which will therefore correspond to the quotient of the two flows or of the flow and the speed.

In accordance with the present invention, there are no separate measurements and the value of the quotient between the flow and the second value is immediately obtained.

According to the present invention, the device is based on the balance between the dynamic force caused by the flow upon a body (which is, as is known, depending from the square of the speed of the fluid) and another force of opposite direction which acts upon the same body and which is itself also depending from the square of the intensity of the second value. The present invention includes any way of causing this second force acting upon the said body to be proportional to the square of the intensity of the second value. Two of these ways are however described as examples in the present description and are considered as preferred, due to the fact that the referred force is applied through the same fluid that is being compared with the second value.

The system becomes thus insensible in respect of eventual different variations from the physical characteristics of the two values which are being compared.

The device for measuring flows based on the balance between the apparent weight (real weight minus impulsion) of a "float" which is heavier than the fluid and the dynamic force caused by the flow and acting upon this float (in an upward direction) is well known. The float is submitted to the action of the flow due to the fact that it is placed within a hollow conical tube through which passes the fluid to be measured. The inner action of the tube, the working position of which is the vertical position, increases upwardly so that the float within the tube defines effective sections of passage for the fluid which increase also in the same direction.

The dynamic force acting upon the float is however proportional to the square of the speed of the fluid in the effective section of passage.

To each speed is therefore associated a force but, as at any point the force has to be equal to the apparent weight of the float, this means that the speed of the fluid in the section of the passage has to be the same whatever the position of balance of the float. As the sections increase upwardly the result is that the flow which causes the float to place itself in these sections has to increase in the same proportion. Thus, according to this well known system, it is the height of the float within the metering tube which indicates the value of the flow.

Let us now imagine a measuring device in which the apparent weight of the float instead of being constant is substituted by an artificial weight which varies with the intensity of a second value. Let us also suppose that this variation is a square dependent value, that is, that the weight of the body will be increased in proportion with the square of the intensity of this second value.

It is evident that now the position of the float will not be only determined by the value of the flow as has been shown previously. Now a variation of the flow will not necessarily imply a change in the position of the float. In fact, if the second value varies at the same rate as the flow, both present forces—artificial weight and dynamic force—will continue to be balanced, though with other values, and there will be no change of position. In fact this balance position is only determined by the quotient of the values of the flow and of the second value, being independent from the same values considered separately.

Let us imagine that at a certain moment the flow has duplicated and that at the same time the second value has also duplicated. If the force which has been caused by the flow upon the float is now quadruplicated the artificial weight of the float has also been quadruplicated. In this case the value of the quotient has not been altered and the float has not altered its position. If the flow has been duplicated and the second value as not been altered, there will be a change of position, due to the fact that the body is being subjected to a dynamic force which is now four times bigger than the artificial weight of the float which remains unchangeable. There will be a corresponding displacement of the float until the same finds a position which will define a section of passage for the fluid twice that of the previous section, in order to reduce the speed to the half. Thus the dynamic force will become four times smaller than the force corresponding to the previous position and there is again a balance between the said force and the artificial weight of the float which has not changed.

The present invention uses this new measurement device for obtaining permanently and instantaneously the quotient between a flow and any other value. Among the many ways for generating a force which will act upon the float, substituting its weight and proportional to the square of the intensity of the second value, two of them will be here described which may be considered as the preferred ones. In all these ways it will however be necessary that, in order to obtain the position of balance, the artificial weight substitutes completely the real weight of the float.

As the float will always have a certain weight, it will be the influence of the same upon the position of balance which has to be eliminated. This may be achieved either by causing the weight of the float to act perpendicularly in respect to the direction of the movement of the float (by placing the measuring tube in a horizontal position) or by using a hollow float in order that the same may have an apparent weight (real weight minus impulsion) equal to the weight of the fluid. In the examples which will subsequently be described, both forms are used at the same time in order to obtain a better sensibility.

In the appending drawings the figures show:

FIGURE 1, a known measuring device for the absolute flows of the float type;

FIGURE 2, one of the preferred forms of a quotient indicator in which the artificial weight is obtained through the centrifugation of the fluid;

FIGURES 3 and 4, two ways of obtaining the second preferred form of obtention of the artificial weight through a second flow of fluid;

FIGURE 5 shows a device for measuring the quotient of different kinds of fluids;

FIGURE 6 shows a case of applying the form of FIGURE 2 to an apparatus for measuring the instantaneous consumption of a vehicle referred to the covered distances;

FIGURE 7 shows an identical apparatus, but based on the form shown in FIGURE 4.

Figure 1:
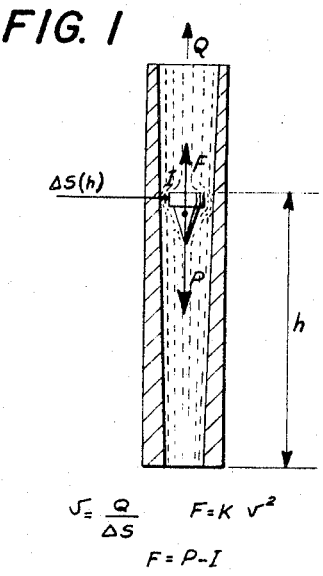
Figure 2:
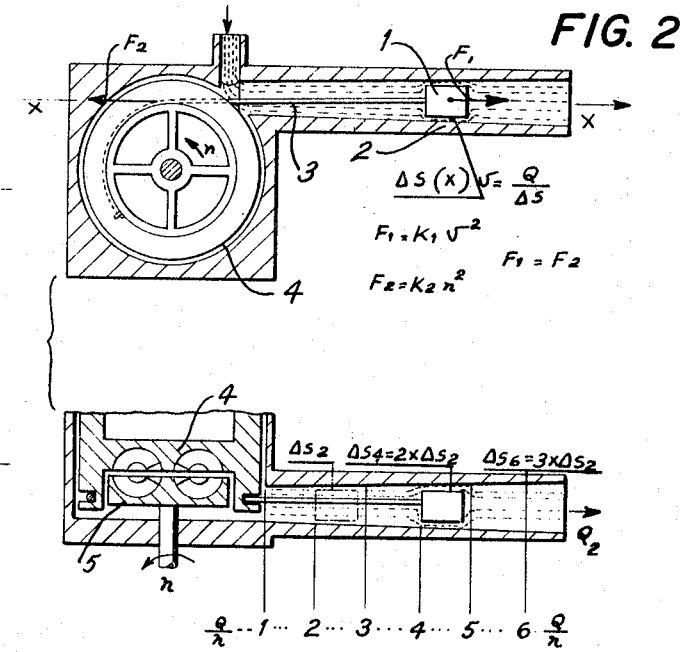

As already stated, FIGURE 2 corresponds to a direct way of obtaining the quotient between the flow Q and a speed $n$, which will therefore be the second value or a representation of the second value (changed into a proportional speed $n$).

The float 1 placed within a tube 2 the section of which has an area that increases in the indicated direction, is mechanically connected, for instance by means of a thread 3, with a cylinder 4 which is forced to move whenever the float 1 moves in the direction of the flow, driven by the dynamic force $F_1$ caused by the flow Q acting upon the float 1. On the other hand the cylinder 4 is also at the same time forced to move in the opposed direction by an hydraulic torque generated by the fluid which is being centrifugated by the blades of the impeller 5 which works as a fluid coupling means with 100% sliding, this permanent torque being expressed by a force $F_2$ opposed to the force $F_1$. Under these conditions the float 1 (or the cylinder 4) is at rest in the position corresponding to the instantaneous balance of the forces $F_1$ and $F_2$. As $F_1$ is caused by the pressure drop caused by the float 1 in the flow, this force is proportional to the square of the speed $v$, that is:

$$F_1 = K_1 \cdot v^2 \quad (A)$$

Being $F_2$ directly proportional to the centrifugal force of the fluid mass which is radially projected by the rotation of 5, this force will be proportional to the square of the angular speed $n$, that is:

$$F_2 = K_2 \cdot n^2 \quad (B)$$

This is therefore the first preferred way of generating a force which is proportional to the square of the intensity of the second value (in this case the speed $n$) which acts permanently upon the float 1.

Let us now see that in fact each stable position of 1 corresponds to a single value of the quotient $Q/n$ and that therefore this position is independent from the values of Q and $n$ considered separately.

Let us suppose that at a certain moment for the pair of values (Q, $n$) the float is in the position corresponding to $Q/n=4$. At this moment $F_1=F_2$. If Q and $n$ duplicate, that is, if the new conditions are ($Q'=2Q$, $n'=2n$), at the same point 4 will be $v'=2v$ and therefore, considering (A), $F'_1=4F_1$. On the other hand from (B) will be $F'_2=4F_2$ and as $F_1=F_2$ will now also be $F'_1=F'_2$. There will therefore be no displacement of the float 1, as is desired, due to the fact that $$\frac{Q'}{n'} = \frac{2Q}{2n} = \frac{Q}{n} = 4$$

Let us now consider the new conditions $$\left( Q'' = \frac{Q}{2}, n'' = n \right)$$

which correspond to a quotient $Q''/n''=Q/2n=4/2=2$, half of the previous value. As $n''=n$ the result is, considering (B) that remains $I''_2=F_2$, but as $Q''=Q/2$, $v''=v/2$ and considering (A), $F_1=F_1/4$. The actual difference between the two forces $F''_1$ and $F''_2$ means that in point 4 the float 1 is no more balanced and it moves in the direction of the bigger force, that is in the direction of $F''_2$. As the float 1 now moves in the direction of the decreasing areas of passage for the fluid S, the speed $v''$ and therefore $F''_1$ increases until they are stabilized at point 2, due to the fact that at that point $$\Delta S_2 = \frac{\Delta S_4}{2}$$

and now $v''$ is again equal to $v$ and therefore $F''_1$ is equal to $F_1$, that means that $F''_1=F''_2$, being this the condition for the stabilization of the float 1 at point 2 (corresponding to $Q/n=2$). Any other variation of Q and $n$ will cause displacements of the float 1 which will tend to place the same into new positions of balance, characteristically of new values of the quotient $Q/n$.

In this form corresponding to FIGURE 2, the fluid itself constitutes the means of generating upon the float 1 a force which is proportional to the square of the second value. There are however many other ways of generating this force. Thus, for instance, any way that uses, as does the previous one, the centrifugal force which is, as is well known, proportional to the square of the angular speed.

Masses rotating with the speed $n$ and acting through centrifugal force upon the inner surface of the cylinder for instance, will also be apt for producing the desired opposed force, opposed to the one caused by the flow of the fluid. The advantage of the first described way is due to the fact that, as both forces have their origin in the same fluid, there will be no errors which would result from eventual different variations of the physical characteristics of the two different mediums and which would not be compensated due exactly to the fact that they were of different nature.

In addition to mechanical and hydraulical systems, there are other systems (for instance electromagnetical ones) which are able to induce forces upon a body which are proportional to the square of the angular speed. All these systems will naturally be considered as comprised in the present invention.

The quotient between a flow and a second value can assume, when this second value is a flow, the particular form of a quotient between two flows. In this case and according to the present invention, the second flow would have to be transformed into a proportional rotating speed $n$ in order to use the previous device. There is however a more direct form of obtaining this quotient which is indicated in the FIGURES 3 and 4. The flow which corresponds to the second value is caused to pass through a second tube (with a cylindrical inner section or with a variable inner section, but such that $\Delta S1/\Delta S2$ (referred to sections at a distance 1) will be different along the total range of measurement), containing a second float 6 which is mechanically connected with the first float 7, in a way that, when one of them moves, due to the result of the action of the respective flow, the other will correspondingly change its position. Due to the action of the passage of the flow $Q_2$, a dynamic force $F_2$ is generated in the opposite direction of $F_1$ and forming the artificial weight of the float 7. This force $F_2$ is also a force which varies with the square of the speed of the fluid being of the same nature as $F_1$, that is, caused by the pressure drop caused by the float 7. In FIGURE 4 the floats 8 and 9 are also mechanically connected in such a way that they move as if they were a single float. As the ratios $\Delta S1/\Delta S2$ are always different for any position of the two floats along the axis $xx$, it is evident that to each point of balance will correspond a well determined value of the quotient of the two flows.

A second flow is therefore the other of the two preferred ways for the obtention of an artificial weight, that is, of an opposite force which varies with the square of the intensity of the second value which acts permanently upon the float which is subjected to the action of the first flow.

In the cases where the second value to be compared is not a flow or a speed, but a force, a torque, a power, or any other value, this value has to be transformed into a rotating speed $n$ (FIGURE 2) or into a flow, which are directly proportional to the intensity of this value and then compared with the first flow, in order to obtain a quotient with the first flow.

Figure 3:
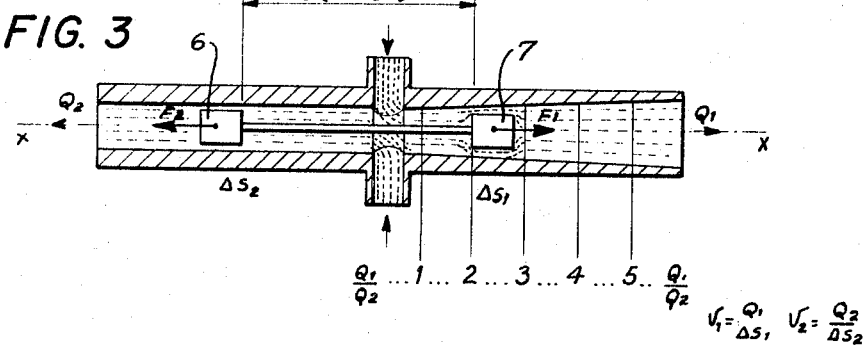
Figure 4:
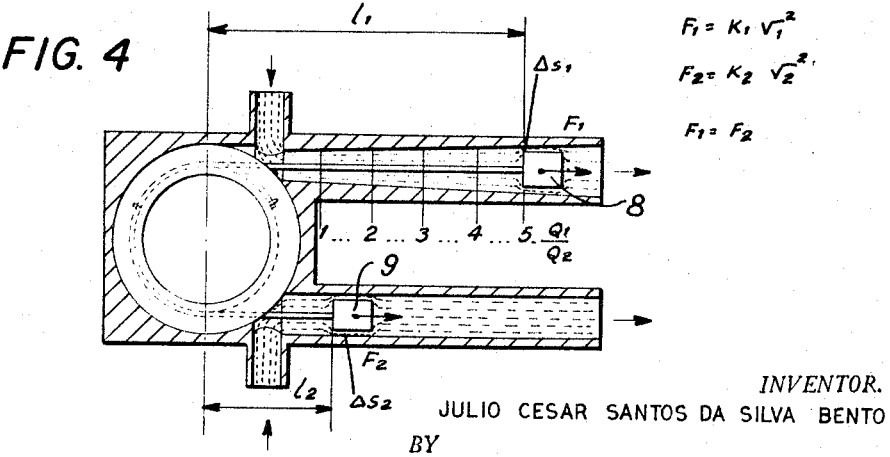

One of the uses for the forms illustrated by the FIGURES 3 and 4 is the permanent and instantaneous measurement of the precentages of two flows. According to the present invention this system provides for the first time directly the quotient of two fluids, for instance, through the way shown on FIGURE 5. This form corresponds to an embodiment of the present invention which, is similar to the one shown on FIGURE 4, but now the bodies 10 and 11 are respectively subjected to the action of the flows $Q_1$ and $Q_2$ but do not act upon the same cylinder. As $Q_1$ and $Q_2$ are of a different nature, the floats 10 and 11 are forced, for instance by means of the threads 12 and 13 to act upon two separate cylinder halves which are separated by means of the wall 14, but magnetically coupled by the magnets 15 in such a way that the parts 16 and 18 rotate jointly and therefore depending from the position of the two floats 10 and 11 within the measuring tubes 18 and 19.

The possibilities for using this principle, according to the present invention, for the measurement of the quotient between a flow and a second value, are innumerous in the field of measuring and controlling apparatus. The particular case of the quotient of two flows is actually a first application of this principle. The following cases which are further described are only given by way of examples, without limiting the scope of the present invention. This is the case for FIGURE 6, which shows an instantaneous device for indicating the consumption of fuel for a vehicle referred to the distance (liters per 100 km., for instance).

This is the first known apparatus of this type which is very simple and which allows for a great precision. This device can be made insensible to accelerations in all directions which are always present in a moving vehicle. This is the fundamental result of using for the first time and according to the present invention, a direct way of obtaining the quotient between the absolute consumption referred to the time unit, of the fuel going to the engine, and the speed of the vehicle at a certain moment. The impeller of the hydraulic coupling 20 is forced to rotate at a speed $n$ which is proportional to the speed of the vehicle, through the action, for instance, of the spindle of the tachometer, by means of a magnetic coupling 19. Within the metering tube 21 passes the flow Q of the fuel which is directed to the engine. As in the case of FIGURE 2 the float 22 forces the indicating cylinder 23 to rotate by means of a mechanical connection which in this case is the thread 24. As in FIGURE 2, the impeller 20 applies a torque to the cylinder 23, through the centifugation of the fuel, thus creating an opposite force. As previously described, the angular position of the cylinder 23 indicates at every moment and directly the quotient $Q/n$ which is the desired relative consumption ($L/100$ km. for instance). For reasons of simplicity and precision, the visual vertification of the position of the cylinder 23 has been adopted, through the interception of the spiral 25 marked on the cylinder 23 and the transparent fixed window 26. In order that the apparatus may be insensible to all mass forces, the float 22 and the cylinder 23 can be hollow, thus having an apparent weight equal to the fuel in which they are submerged (weight equal to impulsion). It is to be noted that in spite of this fact, it will be convenient that the measuring tube 21 works horizontally in order that eventual variations of the fuel density may not generate forces upon the float 22 which could affect the determination of its balance position. We will thus have an apparatus which will indicate directly on the transparent window the instantaneous consumption of a vehicle in liters for 100 km.

If the second preferred way of obtaining the artificial weight corresponding to FIGURE 3 or 4 is adopted, the apparatus could be as shown in FIGURE 7. The artificial weight, in the case of FIGURE 6 was caused by the rotation of an impeller, and is here generated by an artificial flow $Q_2$ which is proportional to the speed of the vehicle. In FIGURE 7 the floats 27 and 28 which are respectively subjected to the action of the artificial flow $Q_2$, and the flow $Q_1$ of the fuel which is directed to the engine, are interconnected by means of the threads 29 and 30 and thus apply opposite forces upon the cylinder 31. It is evident that if they did not both act at the same diameter D, the balance would not correspond to the equality of the forces $F_1=F_2$ but to the equality of the momentum $(F_1 \cdot D_1 = F_2 \cdot D_2)$. The transmission to the outside of the balance position is effected exactly as indicated in FIGURE 6, on the window 32 where the different values of the relative consumption are directly indicated.

In both apparatus forms, the indicating cylinder (23, 31) has a relatively important $PD^2$, in spite of being hollow and without weight due to the fact of being submerged in a fuel, thus acting also as a damper (stabilizer). The spiral which is marked on the cylinder can also have a convenient form in order to realize easily a linear scale.

Thus, it will be seen, particularly in connection with FIGS. 2 and 6, that the device of the invention includes a conduit means through which the fluid is directed, this conduit means being the tube 2 of FIG. 2 and the tube 21 of FIG. 6. A float is located in the fluid which flows along the conduit means, and this float is in the form of the float 1 of FIG. 2 and the float 22 of FIG. 6. A support means, formed by the exterior structure of FIGS. 2 and 6, as well as suitable bearings carried thereby, supports a freely rotatable body for free rotary movement, this body being formed by the member 4 of FIG. 2 and the member 23 of FIG. 6. A means is provided for operatively connecting the float to the freely rotatable body so as to urge the latter to turn in a given direction in response to the action of the fluid on the float, and this latter means takes the form of the elongated flexible filament 3 of FIG. 2 and the elongated flexible filament 24 of FIG. 6.

A rotary member which is coaxial with the freely rotatable body is formed by the shaft which is connected to the impeller 5 of FIG. 2 and by the magnet 19 of FIG. 6. A hydraulic coupling means hydraulically couples the rotary member to the freely rotatable body in a manner providing the possibility of 100% slip therebetween, and this hydraulic coupling means takes the form of the impeller 5 of FIG. 2 and the impeller 20 of FIG. 6. The hydraulic coupling means serves to transmit the rotation of the rotary member centrifugally through the fluid to the freely rotatable body in a manner urging the latter to turn in a direction opposite to that in which it is urged to turn by way of the float. As a result when equilibrium conditions are reached the rotatable body and the float will have predetermined positions indicative of the ratio between the fluid flow and the speed of rotation of the rotary member, and an indicating means is provided for indicating either the position of the float along the conduit or the angular position of the freely rotatable body. Thus, in the case of FIG. 2 the indicating means indicates the position of the float along the conduit 2, while in the case of FIG. 6 the indicating means indicates the angular position of the body 23. While FIG. 2 shows the general principle, FIG. 6 shows a specific application according to which the fluid is fuel supplied to an engine and the rotary member 19 is operatively connected with the tachometer of a vehicle so as to rotate at a speed which is determined by the speed of movement of the vehicle, and thus with the specific application of FIG. 6 it is possible to indicate the amount of fuel consumption per unit of distance traveled.

The said apparatus can also be used for showing at any moment the time that an aircraft can stay airborne, with a certain throttle-setting. In this case the indicated quotients will now be between the flow of the fuel referred to the time unit which is being consumed (kg./h. for instance) and the total weight of the available fuel in the tanks at a certain moment (in kg. for instance). The quotient indicated by the apparatus will therefore indicate for each pair of values the flying time which is still available (for instance, hours). This is another particular case of the general principle which is the object of this invention and which refers to the direct way of obtaining the quotient between a flow and a second value. In this case this second value is a force (weight of the fuel in the tanks).

It is evidently possible, according to the present invention, to conceive innumerous variations, without leaving the scope of the same and therefore the examples given in this description have to be interpreted as not being limitative.

I claim:

1. In a device for directly measuring the ratio between a fluid flow and a rotary speed, conduit means for directing fluid in a given direction therethrough, a float situated in said conduit means for floating in the fluid which flows therethrough to be urged by the fluid in said given direction, a rotatable body, support means supporting said body for free rotation, connecting means coacting with said float and body for operatively connecting said float to said body to urge the latter to turn in a given angular direction in response to the action of the fluid on said float, a rotary member coaxial with said body, and hydraulic coupling means coupling said rotary member to said rotatable body with the possibility of 100% slip therebetween for urging said rotatable body to turn in response to the rotation of said rotary member in an angular direction opposed to the angular direction in which said body is urged by the action of the fluid on said float, whereby when equilibrium conditions are reached the angular position of said body and the position of said float in said conduit means will be indicative of the ratio betwen the fluid flow and the speed of rotation of said rotary member.

2. The combination of claim 1 and wherein an indicating means indicates one of said positions.

3. The combination of claim 2 and wherein said indicating means indicates the position of said float.

4. The combination of claim 2 and wherein said indicating means indicates the angular position of said body.

5. The combination of claim 1 and wherein said hydraulic coupling means communicates with said conduit means for using as the fluid of said hydraulic coupling means the same fluid which flows through said conduit means.

6. The combination of claim 1 and wherein said hydraulic coupling means includes a rotary impeller connected to said rotary member for rotation therewith.

7. The combination of claim 1 and wherein said connecting means is in the form of an elongated flexible filament connected at one end to said float and at an opposite end to said rotatable body.

8. The combination of claim 1 and wherein said fluid is a fuel which flows through said conduit means to an engine for driving the latter, said rotary member having a speed of rotation determined by the speed of movement of a vehicle driven by the engine.

9. The combination of claim 8 and wherein said rotary member includes a pair of permanent magnet portions which rotate together with one of said magnet portions connected to said hydraulic coupling means and the other connected to a vehicle unit, such as a tachometer, for providing said rotary member with a speed of rotation determined by the speed of vehicle movement.

10. The combination of claim 1 and wherein said rotatable body is in the form of a hollow cylinder and wherein said support means has a hollow interior in which said cylinder is accommodated, said interior of said support means communicating with said conduit means so that said rotatable body rotates in the fluid which flows through said conduit means.

References Cited
UNITED STATES PATENTS 2,587,701 3/1952 Davis _____ 73—114
3,201,978 8/1965 Morton _____ 73—114

FOREIGN PATENTS 527,655 10/1921 France.
1,353,552 1/1964 France.
705,299 3/1954 Great Britain.

RICHARD C. QUEISSER, *Primary Examiner.*

JAMES GILL, *Examiner.*

JERRY W. MYRACLE, *Assistant Examiner.*